US008161516B2

(12) United States Patent
Cruickshank, III et al.

(10) Patent No.: US 8,161,516 B2
(45) Date of Patent: Apr. 17, 2012

(54) FRAUD DETECTION IN A CABLE TELEVISION

(75) Inventors: Robert F. Cruickshank, III, Big Indian, NY (US); Marcel F. Schemmann, Marea Hoop (NL); Steven W. Moyer, Boalsburg, PA (US); Daniel J. Rice, Portland, OR (US)

(73) Assignee: ARRIS Group, Inc., Suwanee, GA (US)

( * ) Notice: Subject to any disclaimer, the term of this patent is extended or adjusted under 35 U.S.C. 154(b) by 652 days.

(21) Appl. No.: 11/821,084

(22) Filed: Jun. 20, 2007

(65) Prior Publication Data

US 2008/0034385 A1 Feb. 7, 2008

Related U.S. Application Data

(60) Provisional application No. 60/815,372, filed on Jun. 20, 2006.

(51) Int. Cl.
*H04N 7/173* (2006.01)

(52) U.S. Cl. .............. 725/107; 725/14; 725/16; 725/27; 725/28; 725/29; 725/31; 324/532; 324/533; 324/534

(58) Field of Classification Search .................... 725/27, 725/31, 14–16, 28–29, 107; 709/224
See application file for complete search history.

(56) References Cited

U.S. PATENT DOCUMENTS

| | | | | |
|---|---|---|---|---|
| 6,614,236 | B1 * | 9/2003 | Karam | 324/532 |
| 7,126,927 | B2 * | 10/2006 | Heijenk | 370/329 |
| 2002/0144209 | A1 * | 10/2002 | Ariel et al. | 714/792 |
| 2003/0147351 | A1 * | 8/2003 | Greenlee | 370/232 |
| 2005/0198682 | A1 * | 9/2005 | Wright | 725/96 |
| 2005/0289585 | A1 * | 12/2005 | Pedlow et al. | 725/29 |
| 2006/0248118 | A1 * | 11/2006 | Curtis et al. | 707/104.1 |

* cited by examiner

*Primary Examiner* — Kristine Kincaid
*Assistant Examiner* — Sumaiya A Chowdhury
(74) *Attorney, Agent, or Firm* — Troy A. Van Aacken; Robert J. Starr

(57) ABSTRACT

One or more of a topology location test and a distance test are applied to determine if a CPE device has moved in a cable plant. An indication of service fraud is provided if the CPE topology location or distance test indicate an unauthorized CPE device move.

7 Claims, 3 Drawing Sheets

FRAUD DETECTION IN A CABLE TELEVISION

PRIORITY CLAIM

The present application claims priority to U.S. provisional patent application FRAUD DETECTION IN A CABLE TELEVISION NETWORK, having application No. 60/815,372, filed on Tuesday, Jun. 20, 2006, which is incorporated herein by reference.

TECHNICAL FIELD

The present disclosure relates to fraud detection in cable television networks.

BACKGROUND

Cable television operators lose revenue when unscrupulous subscribers order additional "outlets", i.e. CPE devices for the home, and then move the new CPE device to a neighbor's house and re-sell the service at a discount.

By detecting unauthorized moves of CPE devices, cable operators may decrease revenue lost via such service theft.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Cable Television Distribution System

Figure 1:
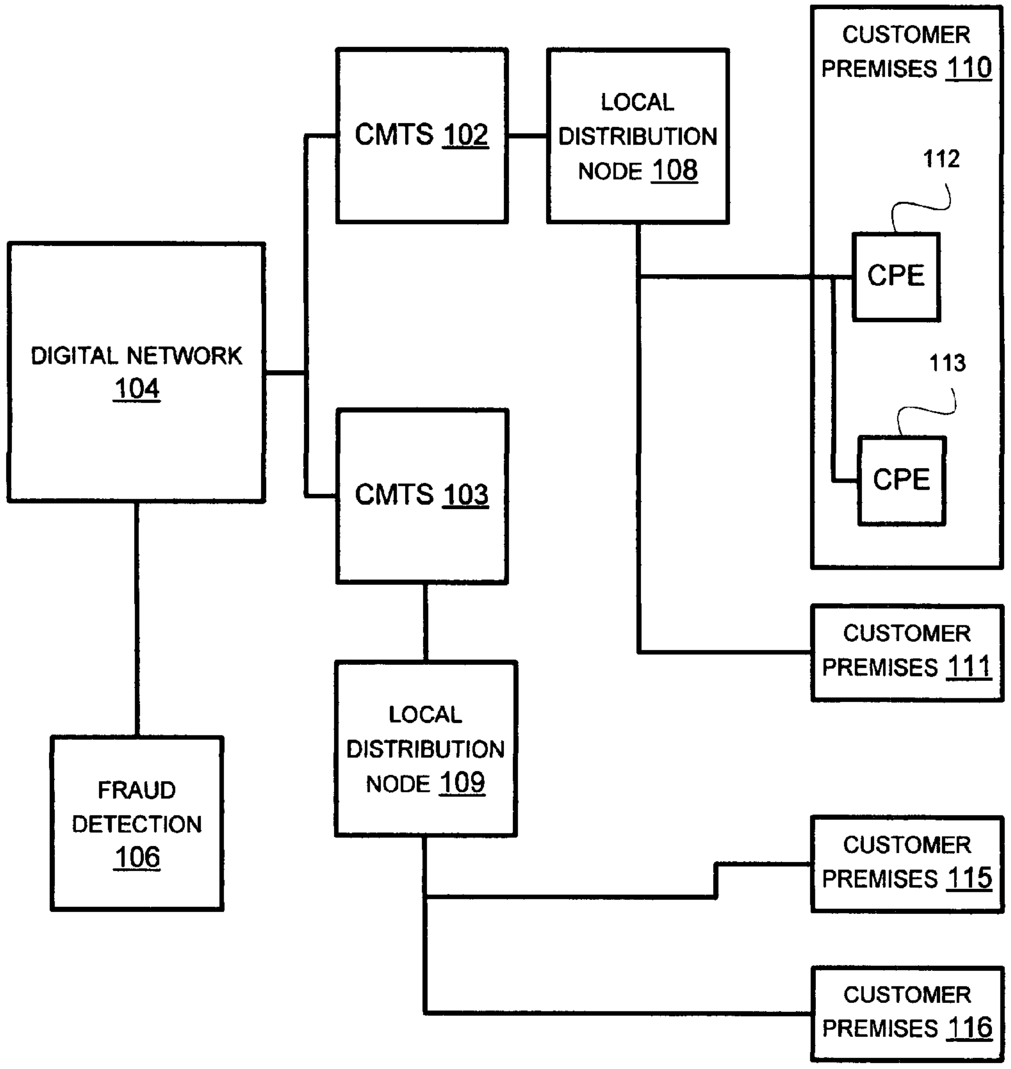
FIG. 1 is a block diagram of an embodiment of a cable television distribution system.

FIG. 1 is a block diagram of an embodiment of a cable television distribution system. The system includes, but may not be limited to, CMTS 102, 103, a digital network 104, fraud detection logic 106, local distribution nodes 108, 109, customer premises 110, 111, 115, 116, and CPE 112, 113. Other elements and/or couplings among the elements have been omitted as they would be apparent to skilled practitioners in the relevant art(s).

The CMTSs 102 and 103 are Cable Modem Termination Systems, which deliver information to and from CPEs coupled to coaxial cable. In some cases, the CMTSs 102 103 may communicate with the CPEs using IP. The term 'IP', as used herein, refers to Internet Protocol. 'CPE' refers to Customer Premise Equipment. The digital network 104 communicates digital information to and from components of the cable television network. For example, the digital network 104 may be an Ethernet backbone and associated routers and switches, among other components.

The fraud detection logic 106 detects potentially unauthorized CPEs. The fraud detection logic 106 may be implemented by, for example, one or more computer systems comprising logic to provide cable television fraud detection as described herein.

The local distribution nodes 108 109 interface CMTSs 102 103 each to a group of CPEs on the same coaxial cable run. Customer premises 110 111 115 116 may include homes or other buildings of cable subscribers. The CPEs 112 113 are Customer Premise Equipment, which receive content and data from the cable television network, provide for rendering of cable content, and tuning and other control interfaces to the cable network. Examples of CPEs are one or more analog and-or digital set top boxes. Other examples and/or embodiments of CMTS, local distribution nodes, customer premises, and CPEs may be apparent to skilled practitioners in the relevant art(s).

Detecting a CPE Move to a Different Coax Run

Figure 2:
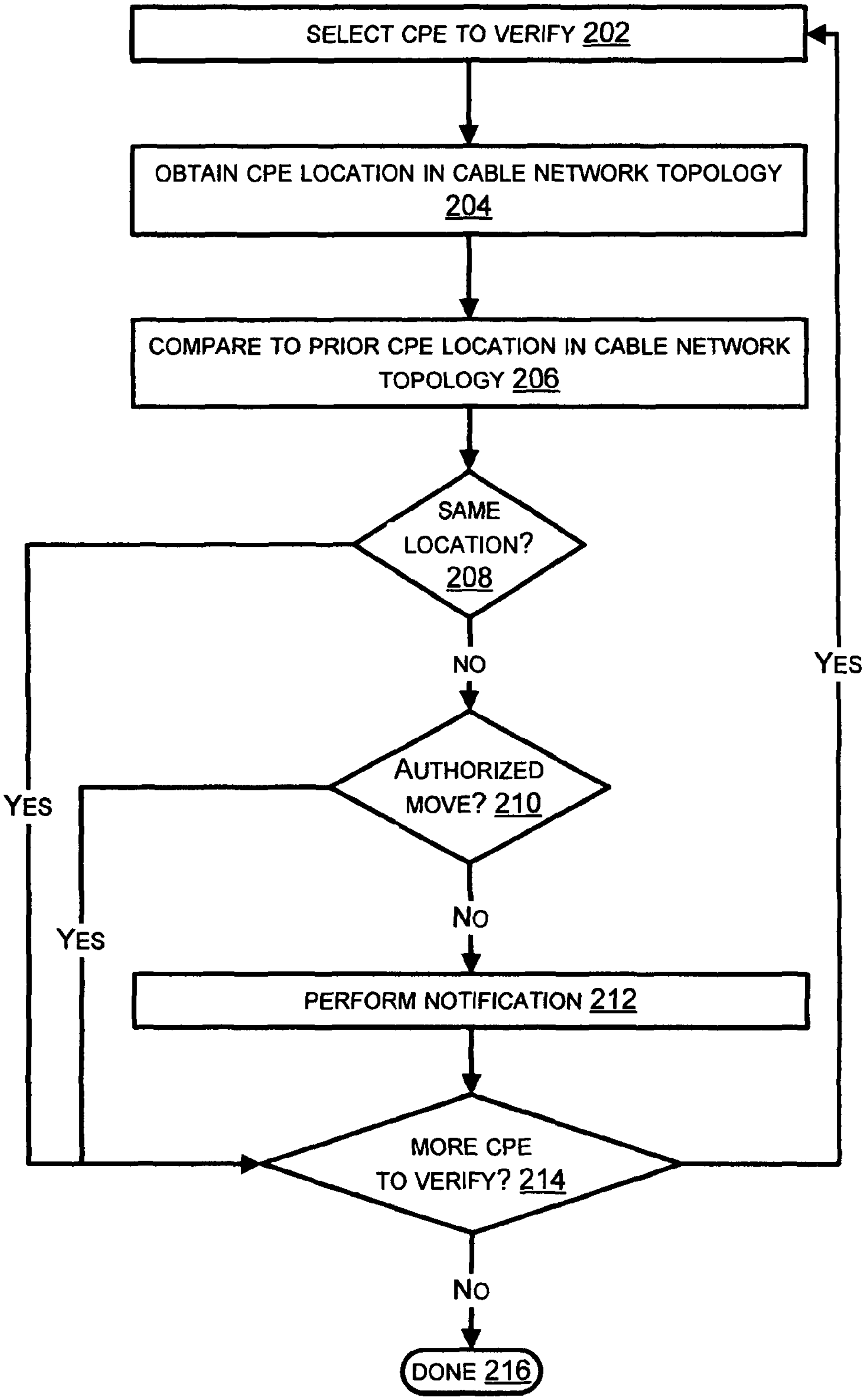
FIG. 2 is a flow chart of an embodiment of a process of detecting a CPE move to a different coax run.

FIG. 2 is a flow chart of an embodiment of a process of detecting a CPE move to a different coax run.

At 202 a CPE device is selected for verification. A topological location verification is performed at 204. The location verification may involve determining if the CPE is on a same local coax run as it was previously, see 206. If it's the same location, see 208, the process may move on to verification of the next CPE device, see 214. Otherwise, if the new location indicates an unauthorized move of the CPE device, see 210, a potential fraud notification may be provided at 212. At 216 the process concludes.

Detecting a Change in CPE Location on a Same or Different Coax Run

Figure 3:
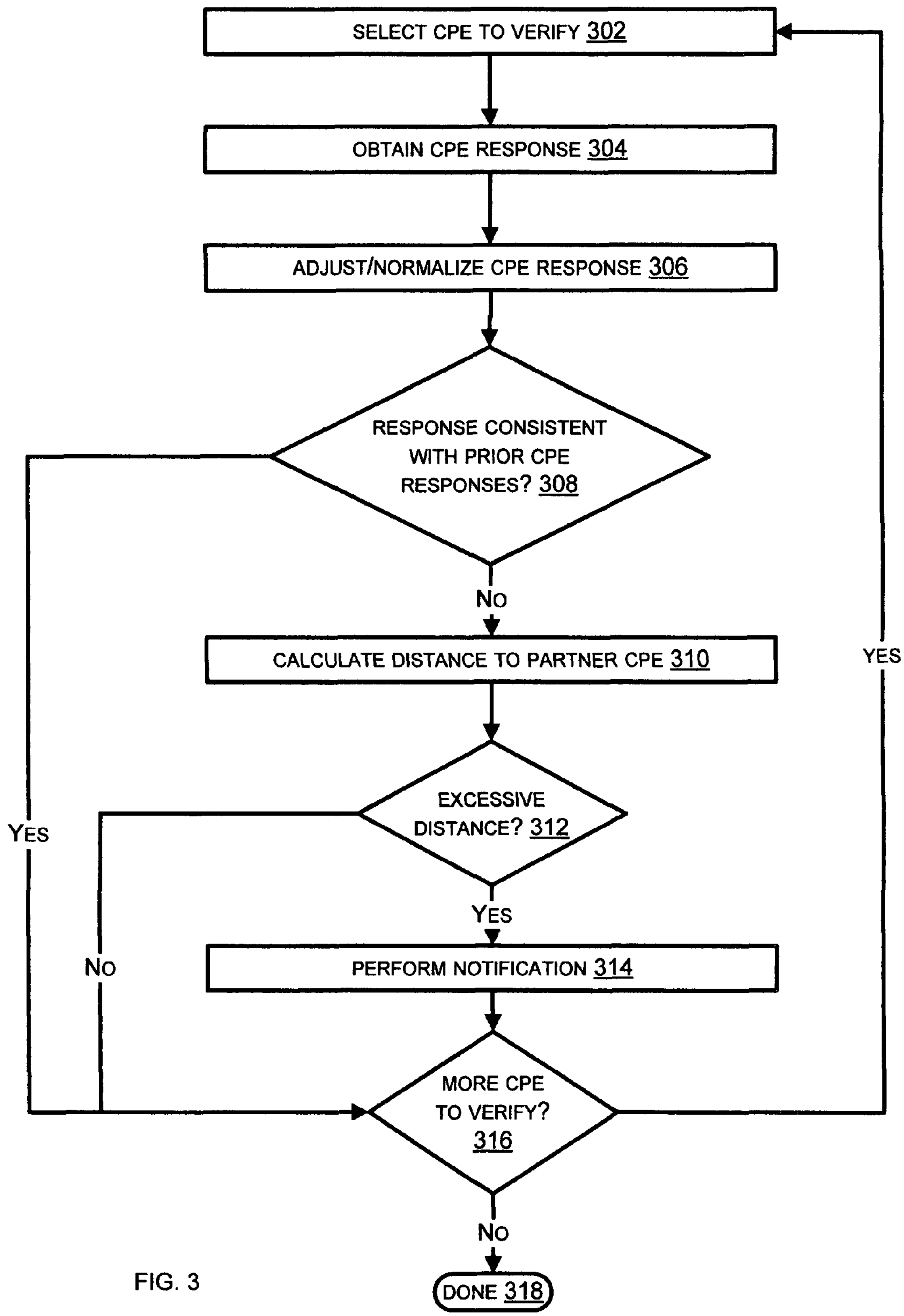
FIG. 3 is a flow chart of an embodiment of a process of detecting a change in CPE location on a same or different coax run.

FIG. 3 is a flow chart of an embodiment of a process of detecting a change in CPE location on a same or different coax run, by performing a distance test.

At 302 a CPE is selected for verification. A test signal or other stimulus may be provided to the CPE, and the CPE's response obtained at 304. The response time may be normalized or otherwise adjusted to account for CPE make, model, software version, and/or network conditions, see 306. If the response time is consistent with prior CPE responses, see 308, the process may move on to verify more CPE devices, see 316. Otherwise, the response time may be applied to determine a distance to a "partner" CPE, see 310. The partner CPE may be a CPE that is known to be co-located with the CPE to verify, for example, within the same customer premises.

If the distance from the partner CPE is excessive, see 312, a potential fraud notification is provided, see 314. At 318 the process concludes.

Applying CPE Location and/or Distance Test Results

The fraud detection logic 106 may apply one or more of a topology location test and a distance test to determine if a CPE device has moved in a cable plant. The fraud detection logic 106 may provide an indication of service fraud if the CPE topology location or distance test indicate an unauthorized CPE device move.

The topological location of two CPE devices associated with a same subscriber may be compared to determine if the topological location of the two CPE devices is different. A difference may indicate a fraudulent use of one or both of the CPE devices.

Distance test results for a same CPE device of a same subscriber at two different times may be compared to ascertain a difference in magnitude of the distance test results. A substantial difference, perhaps factoring in network conditions and the possibility of anomalous results, may indicate fraudulent use of the CPE device. In one embodiment, the distance test may involve measuring times for a CPE device to respond to a known test signal.

The fraud detection logic 106 may exist at a central location in the cable plant, or may be distributed at various different locations within the cable plant.

In response to the location and/or distance test results, the fraud detection logic 106 may generate an indication of service fraud based at least in part on the likelihood of service fraud by a subscriber associated with the CPE device. The likelihood of fraud, in turn, may be based upon one or more subscriber classifications and/or attributes, such as the length of subscriber service or subscriber credit rating.

Before generating an indication of service fraud, the fraud detection logic 106 may determine if the CPE device move is consistent with known cable plant maintenance activity.

Distance test results may be sensitive to environmental and equipment conditions within the cable plant. Thus, the fraud detection logic 106 may compare at least three distance test results, and possibly considerably more, to determine variation among the results and to factor in anomalous results. The fraud detection logic 106 may normalize, average, or other process current distance test results according to a history of past distance test results, again, to factor in CPE device anomalies or anomalies known to be associated with the region of the cable plant comprising the CPE device. The fraud detection logic 106 may discard or de-emphasize anomalous test results.

Again, to factor in CPE device anomalies or anomalies known to be associated with the region of the cable plant comprising the CPE device, the fraud detection logic 106 may adjust and/or normalize distance test results according to one or more of a CPE device make, model, software and/or hardware version, CMTS characteristics, and characteristics of the cable plant servicing the CPE device.

When a fraudulent move is detected, the fraud detection logic 106 may issue alerts, or otherwise take actions resulting in the blocking of use of some or all features accessible by the CPE device moved without authorization. The fraud detection logic 106 may take actions resulting in the blocking of use of some or all features accessible by all CPE devices associated with the subscriber associated with the device that was moved without authorization.

One or more of a CPE device move report for multiple CPE devices, a CPE delay discrepancy report, and a CPE suspicious topology location report may be generated on command or on a regular scheduled basis.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:

applying logic embodied in machine memory to determine if a CPE response is inconsistent with prior CPE responses;

if the CPE response is inconsistent with prior CPE responses, next applying logic embodied in machine memory to perform a distance test to determine if the CPE device is co-located with another device of the same subscriber; and normalizing results of the distance test according to a make and/or model of the CPE device.

2. The method of claim 1, further comprising:

correcting results of the distance test according to anomalies of a network region comprising the CPE device.

3. The method of claim 1, further comprising:

determining if results of the distance test are consistent with known network maintenance activity.

4. The method of claim 1, further comprising:

normalizing results of the distance test according to a hardware and/or software version of the CPE device.

5. The method of claim 1, further comprising:

formulating an indication of fraudulent activity based upon results of the distance test and one or more subscriber attributes.

6. The method of claim 5, further comprising:

formulating an indication of fraudulent activity based upon results of the distance test and one or more of a length of subscriber service and subscriber credit rating.

7. The method of claim 1, wherein performing a distance test further comprises:

the distance test comprising tests from multiple distributed locations within the cable plant.

* * * * *